US007636783B2

(12) United States Patent
Heutchy et al.

(10) Patent No.: US 7,636,783 B2
(45) Date of Patent: Dec. 22, 2009

(54) TRIAL-BEFORE-PURCHASE SUBSCRIPTION GAME INFRASTRUCTURE FOR PEER-PEER NETWORKS

(75) Inventors: Eric D. Heutchy, Carnation, WA (US); Kristofer N. Iverson, Issaquah, WA (US); Stephen P. Miller, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 799 days.

(21) Appl. No.: 11/005,511

(22) Filed: Dec. 6, 2004

(65) Prior Publication Data

US 2006/0123117 A1 Jun. 8, 2006

(51) Int. Cl.
*G06F 15/16* (2006.01)
*G06F 7/04* (2006.01)
*G06F 17/30* (2006.01)
*G06K 9/00* (2006.01)

(52) U.S. Cl. .............................. 709/227; 726/2; 726/3; 726/10; 726/17; 726/19; 726/27; 726/28; 726/29; 726/30; 709/217; 709/218; 709/219; 709/225; 709/228; 709/229

(58) Field of Classification Search ......... 709/217–229; 726/2–3, 9–10, 17, 19, 27–30

See application file for complete search history.

(56) References Cited

U.S. PATENT DOCUMENTS 7,392,390 B2 * 6/2008 Newcombe ................. 713/170

7,401,150 B2 * 7/2008 Shea et al. .................. 709/229
2002/0114465 A1 * 8/2002 Shen-Orr et al. ............ 380/231
2004/0122958 A1 * 6/2004 Wardrop .................... 709/229

FOREIGN PATENT DOCUMENTS

WO WO 9301550 A1 * 1/1993

OTHER PUBLICATIONS

J. Popek and Charles S Kline, "Encryption and Secure Computer Networks", Computer Surveys, Dec. 1979.*
Roger M. Needham and Michael D. Schroeder, "Using Encryption for Authentication in Large Networks of Computers", Communications of the ACM, Dec. 1978.*

* cited by examiner

*Primary Examiner*—William C Vaughn, Jr.
*Assistant Examiner*—Shirley X Zhang
(74) *Attorney, Agent, or Firm*—Workman Nydegger (57) ABSTRACT

A game or other software program is made accessible for execution by clients on a peer-peer network only after a plurality of verifications are made to ensure that control of the software is maintained. With a request sent to a server to access the software, a client includes a nonce and an ID of the user. The server digitally signs a portion of a ticket that is returned to the client, which includes the nonce, a time stamp, and the ID. The ticket is required to access the software. The clients are required to exchange the tickets, verify the digital signature on the portion of each ticket, and use the information therein to confirm that the tickets are current, issued by the correct server, issued to the proper users, and received from the users who are intended to execute the software.

17 Claims, 5 Drawing Sheets

TRIAL-BEFORE-PURCHASE SUBSCRIPTION GAME INFRASTRUCTURE FOR PEER-PEER NETWORKS

FIELD OF THE INVENTION

This invention generally pertains to a security scheme for enabling free access to software for use on a peer-peer network, on a trial basis, while preventing subsequent unauthorized execution of the software after a trial period has expired, and more specifically, is a system and a method for enabling authenticated users provided with client-side credentials to execute gaming software for play on a peer-peer network only during a trial period, or when at least one player has purchased a subscription to play the software.

BACKGROUND OF THE INVENTION

The play of electronic games on the Internet is an increasingly popular pastime. Although online game play has traditionally been carried out by players connecting in a client-server mode to game web sites, such as Microsoft Corporation's MSN GAMES™ website, the growing popularity of instant chat systems, such as Microsoft Corporation's MSN INSTANT MESSENGER™ service has provided yet another venue for game play between friends on peer-peer chat networks. Some games are provide free of charge when the user downloads and installs a chat program. However, it is also contemplated that other selected games will be provided only to those who subscribe to a Premium Access chat or messenger service.

Unlike games playable only by those who are accessing a specific gaming web site, it is relatively difficult to support a trial play option for premium service games on a chat service or other type of peer-peer network, since the game content will normally be fully available to the trial player, who has not provided credit card information for accessing the premium games on a subscription basis. Hackers can thus fully access the content of premium subscription games, and it is likely that they will attempt to avoid paying the subscription fee for the continued right to play the games. Preferably, a trial usage of the game should end after a predefined period of time or after a predefined number of game plays, unless at least one player is or becomes a subscriber to the premium software content usable over the peer-peer system. But once the premium software content has been made available to a user, it can be very difficult to ensure that unauthorized use of the game by at least some users does not continue.

There are several undesired scenarios that can arise as a result of making software available for trial usage on a peer-peer network. These include the case where a hacker extracts the premium software file and hosts it on a custom server of the hacker. By simply modifying an eXtensible Markup Language (XML) file for executing the software and then distributing the modified XML file to their friends, the hacker and friends could execute the software for free, indefinitely. A hacker might also cache a valid "ticket" issued by a Security and Access Service (SAS) of the peer-peer system providing the game software, e.g., if the ticket to play premium software was obtained from a friend who is a paying subscriber. By saving the SAS ticket as a persistent cookie (or by employing some other simple cookie hack), a hacker would be able to continually execute premium access software for free with other non-subscribing friends who are connected over the peer-peer network. As a further scenario, hackers might continually reset the trial token period for the software game, so that the hackers and their friends could play the game indefinitely in the free trial mode. However, the need to frequently reset the trial period might eventually deter this approach.

Clearly, it is important to substantially reduce the possibility that a user accessing premium game software or other software on a trial basis might simply steal the content and offer a free version for others to use. It would also be desirable to substantially reduce the possibility that an SAS ticket might be used or reused by a different person than the subscriber to whom it was originally issued. One goal is thus to prevent continued access to a premium software by anyone who has not signed up for the premium access service and who has not actually been authenticated as a paying subscriber. Preferably, it should not be possible to execute premium software without becoming a subscriber, simply by resetting the trial period to use the software. It would also be desirable to prevent other parties from accessing and tampering with paying subscribers' data. Ultimately, the most important goal is securely manage trial usage of premium software, to encourage users to try the software, and if they enjoy or benefit from using the software, to become subscribers to the premium access service that enables the software to be executed on a continuing basis.

SUMMARY OF THE INVENTION

The present invention was developed to securely manage trial usage of premium game software by users coupled in a peer-peer chat network. However, it will be apparent that this invention is not limited to enabling trial usage of game software on a chat network, but can instead be employed to enable usage of any type of executable software on any type of peer-peer network. One aspect of the present invention is thus directed to a method for enabling a trial use of a software program by users employing clients that are communicating with each other over a peer-peer network. The method includes the step of executing a security control on the client, producing a nonce that is maintained for at least a current session during which the software program is used. The nonce is transmitted to a server when requesting access to execute the software program for trial use. In response to the request, the server produces a ticket having a portion that is digitally signed using a private server key. This portion of the ticket includes the nonce and an indication of the user requesting the access to execute the software program, which can either be included with request sent by the client, or simply determined when the client connects to the server. The server returns the ticket to the client. All of the clients with users who will be employing the software program over the peer-peer network then exchange tickets. The clients are required to apply a public key to verify the portion of each ticket that is digitally signed by the server. Once verified, each client is required to confirm that the nonce included in the portion of the ticket for the client matches the nonce produced by the client; confirm that the indication of the user included in the portion of each ticket is actually associated with the user employing the corresponding client in the peer-peer network; and confirm that all of the tickets are current. In response to all confirmations succeeding, the clients are enabled to execute the software program.

Optionally, a user may be banned from downloading or executing the software program because of some previous behavior. If so, the method can optionally include the step of precluding a client from executing the software program if the user employing the client has been banned from accessing the software program. As another option, all of the clients coupled in a peer-peer network can be precluded from executing the software program if any user has been banned from accessing the software program.

Each of the users of the clients can be associated with one or more of a plurality of different groups, determined e.g., based upon the indication of the user. If the intent of enabling a user to access the software program on a trail basis, the method can include the step of issuing a trial token to each client during a trial period, to enable the client to execute the software program during the trial period. Thus, the plurality of groups might include a subscriber group that includes subscribers to the software program, as well as a trial group that includes users who have been issued a trial token to execute the software program during a trial period.

The method further preferably comprises the step of including a server time stamp in the portion of the ticket that is digitally signed. The step of confirming that each ticket is current also preferably comprises the step of determining that the time stamp for each ticket is not more than a predefined time interval before or after the time stamp in any other ticket provided the clients who are to execute the software program.

The step of indicating the user in the portion of the ticket that is digitally signed preferably comprises the step of including a hash of an indicia of the user (e.g., the email address of the user). Each client can then determine that the indicia that was hashed by the server matches that of the user employing the client, to confirm that the indication of the user included in the portion of each ticket received from another client is actually associated with the user employing the other client in the peer-peer network.

Other steps of the method can include issuing a trial token to a user when the user first requests access to execute the software program, and only enabling the client to execute the software program if the trial token is still valid or if the client has become a subscriber to the software program. Accordingly, another step of the method provides for enabling a user to become a subscriber to the software game.

Although not intended to be thus limited, the software program can clearly comprise a software game that is playable by the users over the peer-peer network when the software game is executed by the clients employed by the users. Clearly, access to and execution by clients over a peer-peer network of other types of software programs can also be managed by this invention, as noted above.

Another aspect of the invention is directed to a memory medium having machine executable instructions for carrying out steps of the method discussed above. Yet another aspect of the invention is directed to a system for enabling a trial use of a software program over a peer-peer network. The system includes a server computing device that is selectively coupled to any client computing device requesting to execute the software program. The server computing device includes a network interface for coupling to a network, a memory that stores machine executable instructions, and a processor that is coupled to the network interface, and the memory. The processor executes a plurality of machine instructions that cause the processor to carry out a plurality of functions. These functions include responding to a request from a client computing device that includes a nonce produced by the client computing device and conveyed with the request. The server computing device responds by transmitting a ticket to the client computing device that is required to enable the client computing device to execute the software program. The ticket has a portion that is signed with a private key on the server computing device. This portion includes the nonce, and optionally includes an indication of a user employing the client computing device, as well as a time stamp to indicate a current time. The ticket is sent by the server computing device to the client computing device, along with machine instructions that must be executed by the client computing device to enable the client computing device to execute the software program. These machine instructions require that the client computing device verify the digitally signed portion of the ticket using a public key corresponding to the private key, and once verified, confirm that the ticket is current and was issued to the client computing device. The instructions also require the client computing device to exchange tickets with any other client computing device with which the software program will be interacting over the peer-peer network, and confirm that the ticket received from any other such client computing device is current and includes an accurate indication of the user of the other client computing device. The software program is made accessible for execution by each client computing device that has successfully concluded each confirmation required.

Other functions performed by the server computing device are generally consistent with the steps of the method discussed above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Exemplary System for Implementing Present Invention

Figure 1:
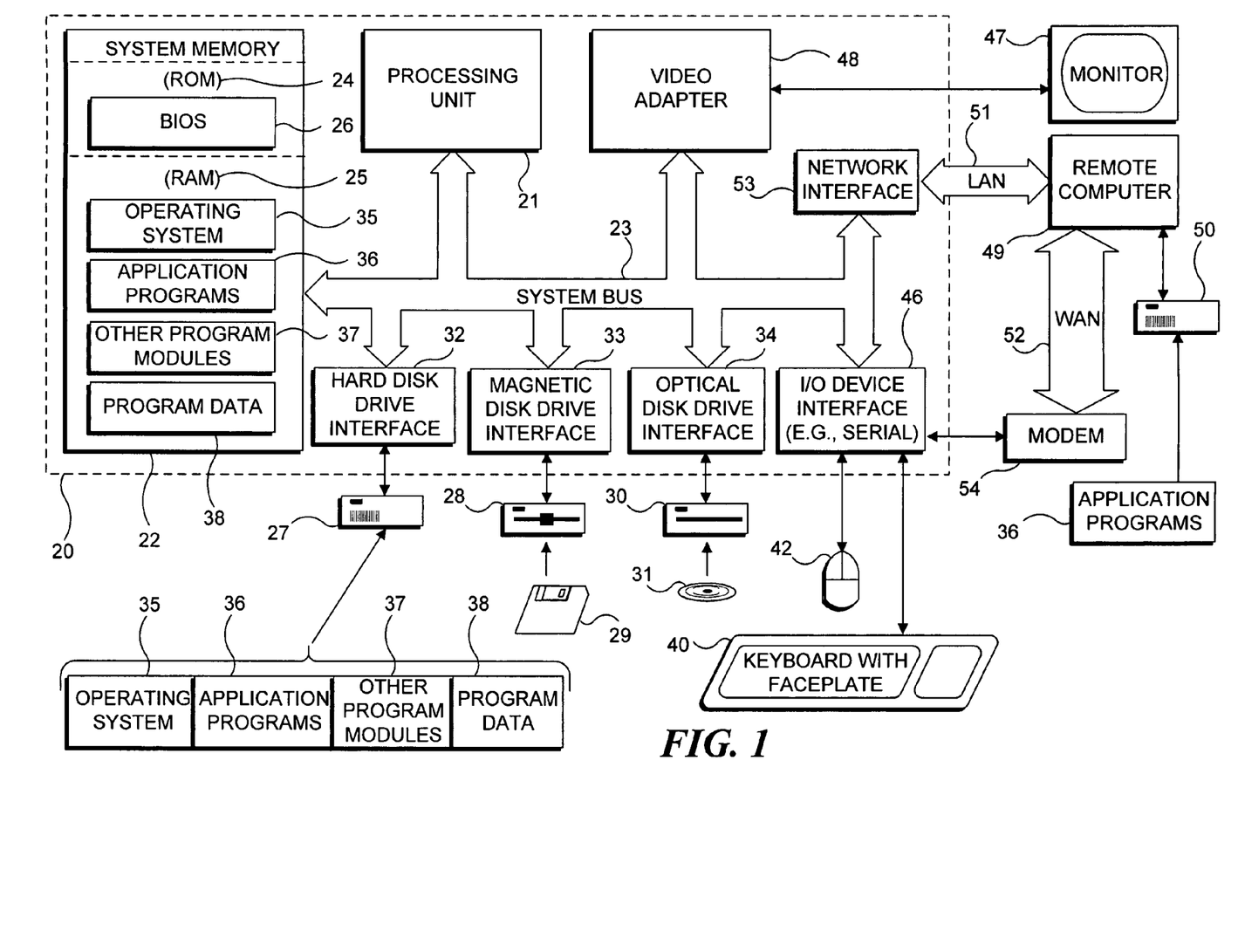
FIG. 1 is a functional block diagram of a generally personal computer (PC), which is suitable for use both for a server computing device and as a client computing when practicing the present invention to manage trial use of game software.

With reference to FIG. 1, an exemplary computing system suitable for implementing various portions of the present invention, including providing the functionality of a server in a gaming service such as Microsoft Corporation's ZONE™ gaming service, or operating as a client computing device that is used to connect to the server computing device to initiate download and execution of a software program to interact with other client computing devices over a peer-peer network.

The system includes a general purpose computing device in the form of a conventional PC 20, provided with a processing unit 21, a system memory 22, and a system bus 23. The system bus couples various system components including the system memory to processing unit 21 and may be of several types of bus structures, including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the PC 20, such as during start up, is stored in ROM 24. The PC 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a compact disk-read only memory (CD-ROM) or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer readable media provide nonvolatile storage of computer readable machine instructions, data structures, program modules, and other data for PC 20. Although the exemplary environment described herein employs a hard disk, removable magnetic disk 29, and removable optical disk 31, it will be appreciated by those skilled in the art that other types of computer readable media, which can store data and machine instructions that are accessible by a computer, such as magnetic cassettes, flash memory cards, digital video disks (DVDs), Bernoulli cartridges, RAMs, ROMs, and the like, may also be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into PC 20, and provide control input through input devices such as a keyboard 40 and a pointing device 42. Pointing device 42 may include a mouse, stylus, wireless remote control, or other pointer. As used hereinafter, the term "mouse" is intended to encompass virtually any pointing device that is useful for controlling the position of a cursor on the screen. Other input devices (not shown) may include a microphone, joystick, haptic joystick, yoke, foot pedals, game pad, satellite dish, scanner, or the like. These and other input/output (I/O) devices are often connected to processing unit 21 through an I/O interface 46 that is coupled to the system bus 23. The term I/O interface is intended to encompass each interface specifically used for a serial port, a parallel port, a game port, a keyboard port, and/or a universal serial bus (USB). A monitor 47 or other type of display device is also connected to system bus 23 via an appropriate interface, such as a video adapter 48. In addition to the monitor, PCs are often coupled to other peripheral output devices (not shown), such as speakers (through a sound card or other audio interface—not shown) and printers.

PC 20 can operate in a networked environment using logical connections to one or more remote computers, such as a remote computer 49. Remote computer 49 may be another PC, a server (which is typically generally configured much like PC 20), a router, a network PC, a peer device, or a satellite or other common network node, and typically includes many or all of the elements described above in connection with PC 20, although only an external memory storage device 50 has been illustrated in FIG. 1. The logical connections depicted in FIG. 1 include a local area network (LAN) 51 and a wide area network (WAN) 52. Such networking environments are common in offices, enterprise wide computer networks, intranets, and the Internet.

When used in a LAN networking environment, PC 20 is connected to LAN 51 through a network interface or adapter 53. When used in a WAN networking environment, PC 20 typically includes a modem 54, or other means such as a cable modem, Digital Subscriber Line (DSL) interface, or an Integrated Service Digital Network (ISDN) interface for establishing communications over WAN 52, such as the Internet. Modem 54, which may be internal or external, is connected to the system bus 23 or coupled to the bus via I/O device interface 46, i.e., through a serial port. In a networked environment, program modules depicted relative to PC 20, or portions thereof, may be stored in the remote memory storage device. It will be appreciated that the network connections shown are exemplary and other means of establishing a communications link between the computers may be used, such as wireless communication and wide band network links. One or more servers employed to provide a gaming service functions will typically comprise one or more computing devices much like that described above, but may access much larger hard drives or other non-volatile memory systems for storing data about subscribing users and for other elements of the gaming service.

Exemplary Peer-Peer Network

Figure 2:
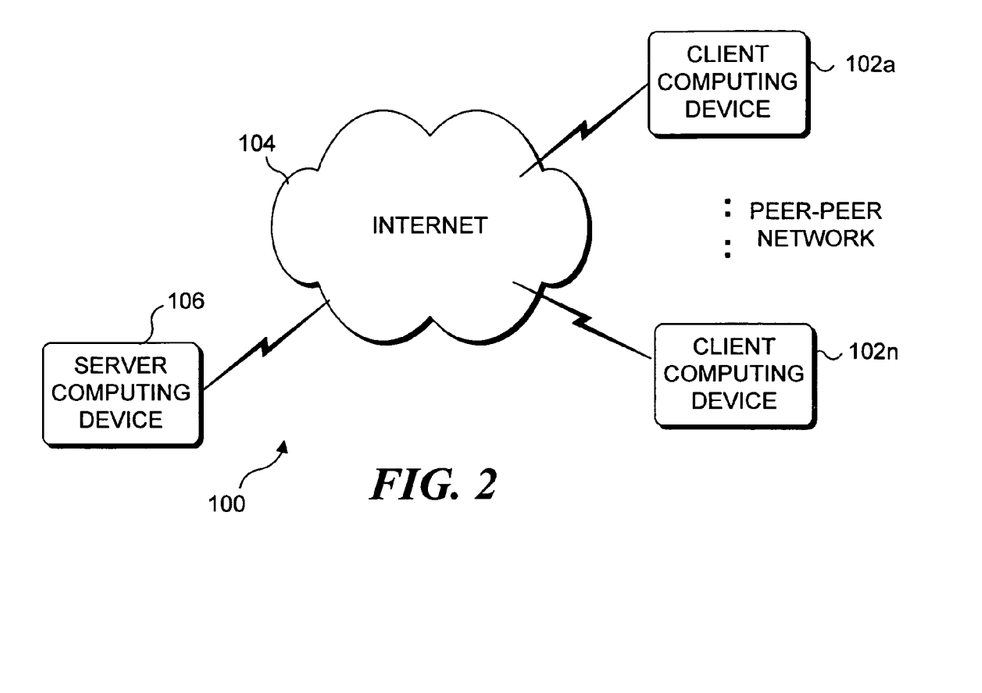
FIG. 2 is a schematic block diagram illustrating a peer-peer online session in which a plurality of client computing devices are coupled together via an messenger chat program to play a software game that has been downloaded from a server computing device over the Internet, or otherwise provided to the client computing devices.

A schematic block diagram 100, which is shown in FIG. 2, illustrates an exemplary peer-peer network, such as Internet 104, over which client computing devices 102a through 102n are coupled in communication. These client computing devices may all be running a peer-peer application, such as Microsoft Corporation's MSN MESSENGER™ chat program, or a different type of chat program, or some other type of peer-peer program. Also, it should be understood that instead of using Internet 104, the client computing devices can be coupled peer-peer over a local area network (LAN), or a wide area network, or some other form of network. In addition, each of the client computing devices can optionally couple in communication with a server computing device 106, which controls access to a software program that the client computing devices will request to access and execute. The client computing devices interact over the peer-peer network, but download the software program from the server computing device in a client-server mode, or the software program may be pre-installed or otherwise provided to the client computing devices, e.g., on a distributed memory medium. Once downloaded or otherwise provided to the client computing devices, a security wrapper on the software program prevents the client computing devices from decrypting or otherwise enabling use the software program until predefined verifications or confirmations are met.

An initial application of the present invention is used for controlling and managing access to premium software games on such a peer-peer network. The present invention enables client computing devices to execute the premium game software so that users of the client computing devices can play the game software over the peer-peer chat network on a trial basis, and if they enjoy the experience, can pay to become a subscriber to these premium software games. However, as noted above, it will be understood that the present invention is not limited to controlling access and use of game software. Instead, access and execution of almost any type of software program by client computing devices, for use over a peer-peer network, can similarly be controlled and managed by the present invention.

Functional Elements of an Exemplary System in Accord with the Present Invention

Figure 3:
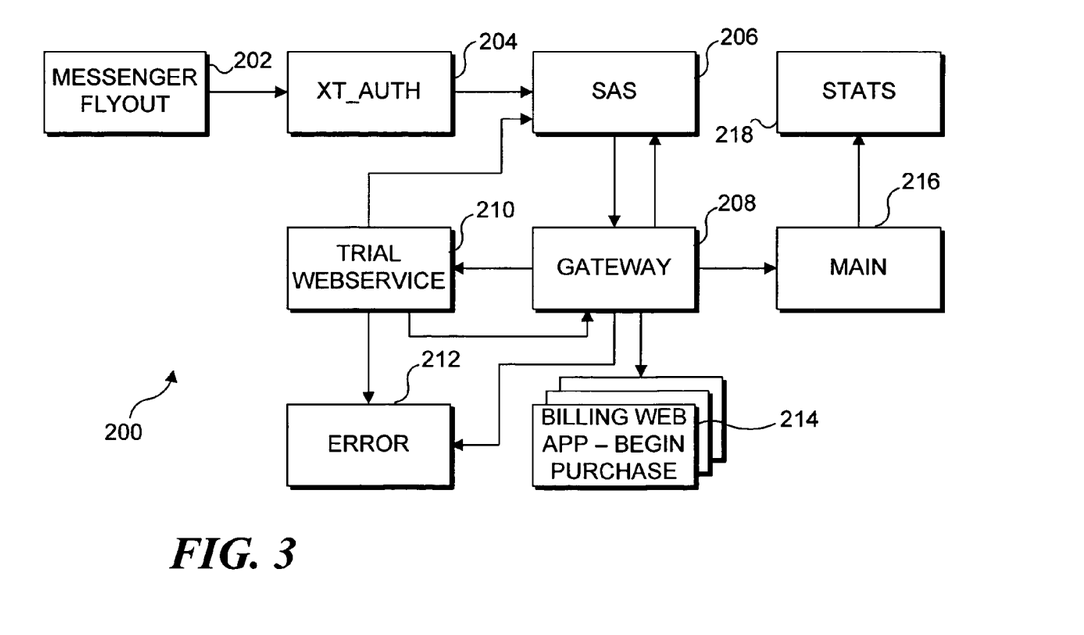
FIG. 3 is a schematic block diagram that illustrates the function interaction between a messenger chat program and other components of a system in accord with the present invention to enable a user to execute a software game intended to be played in the peer-peer chat network.

FIG. 3 illustrates the functional components of a system 200 used in one preferred embodiment of the present invention where it controls access and execution of games intended to be played by users interacting over a peer-peer chat network, such as the MSN MESSENGER™ chat program. As will be evident from the following discussion, the MSN MESSENGER™ chat program includes an option enabling users to select a premium software game program and to invite one or more other users (e.g., friends or contacts of the user) to play the selected premium software game over the peer-peer network. When selected, this option causes a fly out window 202 containing a browser control to be displayed to the user and to each other invited user who has accepted the invitation to play the game. By agreeing to play the selected game, each user thus initiates transmitting a request over the network to access the selected premium game program on a server computing device, which is located at a predefined network address. The server computing device will preferably be associated with the chat program, and in this exemplary application of the present invention, is disposed at Microsoft Corporation's ZONE™ gaming web site.

The browser control that is opened in the chat program user interface display points to an xt_auth page 204 on the server. This page primarily exists to provide an abstraction (over a network address link) for redirecting the client computer device to a Security and Access Service (SAS) 206. When each client computing device connects to xt_auth page 204, a page forces in the client to download a security control. The security control causes the client to create a nonce (e.g., a one-time random value of 64 bits), which the client computing device maintains for the duration of the session in which the game software will be executed by the client computing device. In this particular embodiment, the redirection to SAS causes a query to be sent by the client computing device that includes the nonce that was generated for this session, a PASSPORT™ indicator (not required, but usable for billing purposes if the user becomes a subscriber), a return address or uniform resource locator (URL) for the client computing device, and a request for a ticket to play the premium software game. The ticket is required to enable the user of the client computing device to download and access the software program.

In response, SAS creates a peer-peer ticket that includes a portion, which is digitally signed using a private key, as well as a public section. The private key is associated with a public key that is known and can readily be determined by the client computing devices. The digitally signed portion includes a ticket T1, the nonce, and a hash of an identifier (ID) (or optionally, just the clear ID) of the user making the request for the ticket, as well as one or more tokens. In this embodiment, the ID is preferably an e-mail address of the user, although other types of identification for the user could alternatively be used. It is not necessary to hash the ID, which is done in this embodiment with an MD5 hash algorithm. However, since the e-mail address might be viewed as private information about the user, it is hashed in this embodiment, to minimize exposing that information to unintended parties. The response sent by SAS 206 includes Jscript code that must be executed by the client computing device in order to proceed with accessing the game software and which forces the client computing device to load a gateway page 208 in the browser control. The gateway page creates a Statistics activeX object, which returns the requested ticket to the client computing device.

In this embodiment, at a main block 216, the Jscript executing on the client computing device examines the ticket received from the server to determine whether the user has subscribed to the premium access service, or is still only a trial user. If a trial token has not previously been received by the client computing device for the selected premium game software, and if the query sent to SAS 206 doesn't indicate that such a trial token has recently been written, the Jscript requests a page from the server (on a trial Web service 210), by requesting that the server write a trial token to an SAS database. However, if the trial Web service indicates that a trial token was previously written for the user, but doesn't currently exist in the SAS database, the client computing device of the user is redirected to an error page 212, which indicates to the user that trial Web service 210 is not functioning properly. If a trial token was previously written and a request from the client computing device was only for a ticket to play the premium software game during the trial period, stats 218 for the user will already have been written and are still valid. If not previously provided because the user is trying the game software for the first time, the trial Web service will write a trial token to the SAS database for the user and then send HTTP headers to the client computing device to redirect the client computing device to the SAS so that the completed query provided in the initial request can be answered.

As illustrated below, a user can cause a client computing device to initiate purchase of a subscription to the premium software service. Typically, such a request to subscribe will be made by a user who is already trying a game software, when the user clicks on a control in the chat program interface to initiate purchase of the subscription. If the user's trial period has expired or if the user was a subscriber, but the subscription has expired, and (in this embodiment) if the user has not been invited to play a game in which any other player is already a subscriber, the user will be asked to subscribe, or start a new game, or cancel the game play. A request by the user to purchase a subscription is directed to a billing web application 214. During the purchase of the subscription, the subscription fee can be associated with the user's Passport billing account, e.g., for charge to a credit card of the user that is on file. After a user has subscribed to the game program, the billing web application redirects the client computing device to SAS 206, to request new credentials (i.e., a ticket) for the user that indicates the user is a subscriber.

Main block 216 is also responsible for confirming that the ticket received from SAS 206 is valid, by using the public key to verify the digitally signed portion of the ticket, and for comparing the nonce included in that portion with the nonce retained by the client computing device. In main block 216, the Jscript initiates an exchange of the tickets that were issued to each client computing device that will be connected for playing the premium software game. Upon receiving a ticket from another computing device connected in the peer-peer network, each client computing device must verify the digitally signed portion with the public key corresponding to the private key used by the server to digitally sign the portion. Each client computing device then verifies that the other tickets (received from the one or more other client computing devices) are current (by comparing a server time stamp on the tickets), and confirm that the tickets were issued to the actual user intended to play the game (rather than to a different user) from whom the ticket was received, by comparing the indicated ID of the other user provided in the ticket with the known ID of the user. For example, in this embodiment, the hash of the e-mail address that is known to be used by another user is compared to the hash of the e-mail that was included in the digitally signed portion of the ticket that was received from the other user and should be the same.

Assuming that the tickets from each of the other users are current and were actually issued to the other users from whom they were received, main block 216 further confirms that the trial token issued to any other user(s) has not expired, assuming that at least one user who will be playing the game is not a subscriber. While it might optionally be required that all users either have been issued trial tokens that are within an active trial period of be subscribers to the premium game software, this preferred embodiment will enable any user (who is not banned) to download and execute the premium game software if at least one of the users is a subscriber to the game software. Further details of the various confirmations that must be carried out in main block 216 before the client computing device is enabled to download, decrypt, and execute the premium game software are discussed below. Once all confirmations are successfully made, main block 216 requests download of the premium game software from the server and then initiates decryption of the game software, so that it can be executed by the client computing device. The users of the client computing devices that are thus successful in carrying out this step can then interactively participate in playing the premium game software over the peer-peer network.

Exemplary Chat Application User Interface

Figure 4:
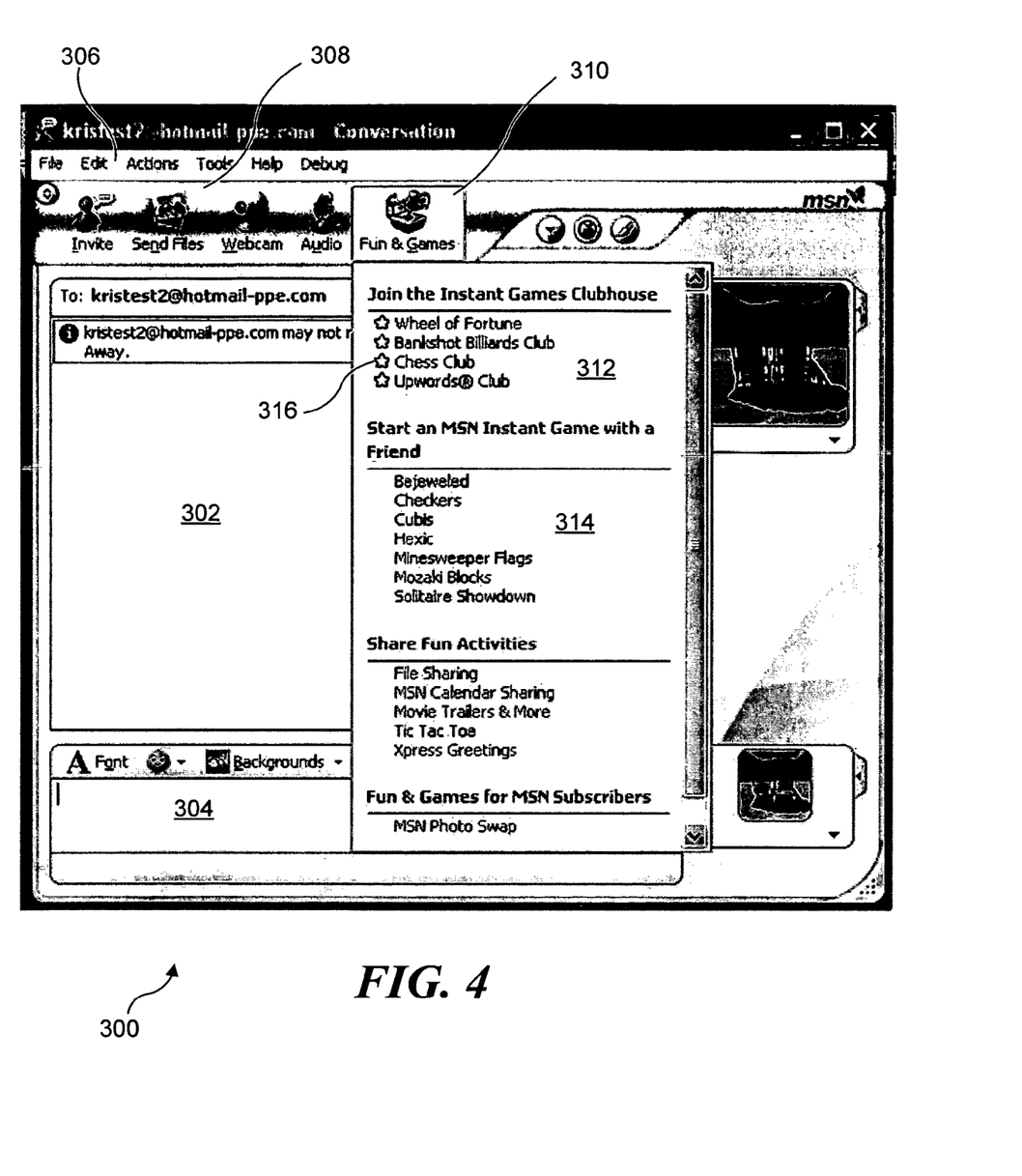
FIG. 4 is an exemplary messenger chat session user interface illustrating the option to select a software game that can be played over a peer-peer network.

An exemplary MSN MESSENGER™ chat program user interface 300 for practicing the present invention is illustrated in FIG. 4. As is typical of other such chat user interfaces, it includes a chat message window 302, and a message composition window 304. At the top of the user interface is disclosed a generally conventional menu bar 306 and a toolbar 308. An option 310, entitled "Fun and Games" has been selected in this example, causing a premium game list 312 and a free game list 314 to be displayed, along with other options. In this example, it is assumed that the user has selected a premium game 316, entitled "Chess Club," with the intention of inviting another user of the chat program to play the game.

Figure 5:
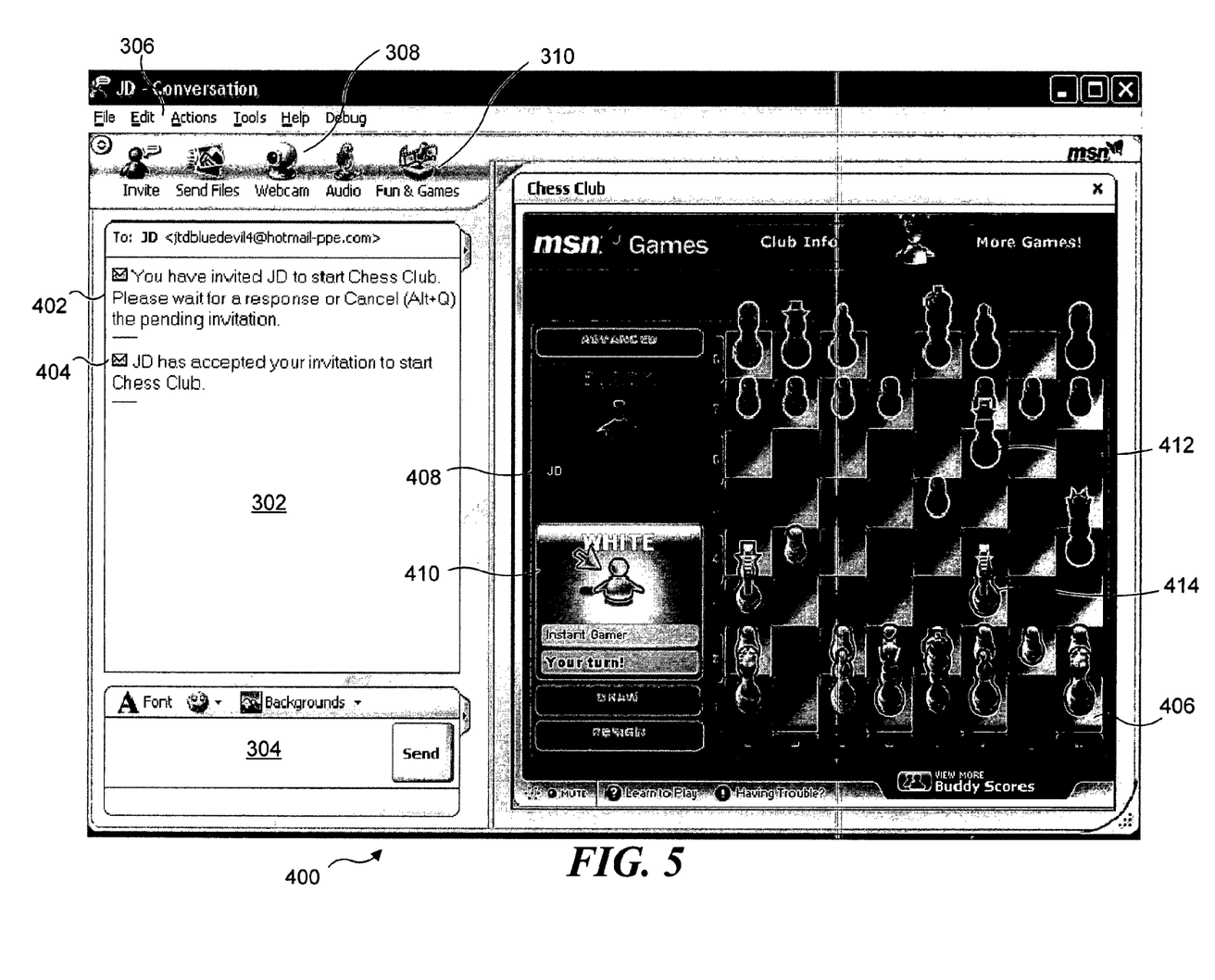
FIG. 5 is an exemplary messenger chat session user interface showing a chess game being played over a peer-peer network, using the present invention to manage trial usage of game software.

FIG. 5 illustrates the exemplary user interface of the chat program after another user with initials "JD" has been invited to play "Chess Club" and has accepted. An invitation 402 to play the game is shown in message window 302, along with an acceptance 404 by JD of the invitation to play the game. It is assumed that both the user to whom this user interface is displayed and the other user JD have successfully made the confirmations discussed above, enabling the premium game program to be downloaded and decrypted for execution on the client computing device of each user. Accordingly, FIG. 5 illustrates a chess game board 406 that is displayed in the browser control portion of the chat session user interface after play has started between the two users. JD has been assigned the black chess pieces, as indicated in a block 408, while the user of the chat program that is displayed is playing the white pieces, as indicated in a block 410. Chessboard 406 shows the positions of black chess pieces 412 and white chess pieces 414, for the current state of the game between the two users that is being played over the peer-peer network.

Exemplary Flow Chart of Logical Steps for Implementing the Present Invention

Figure 6:
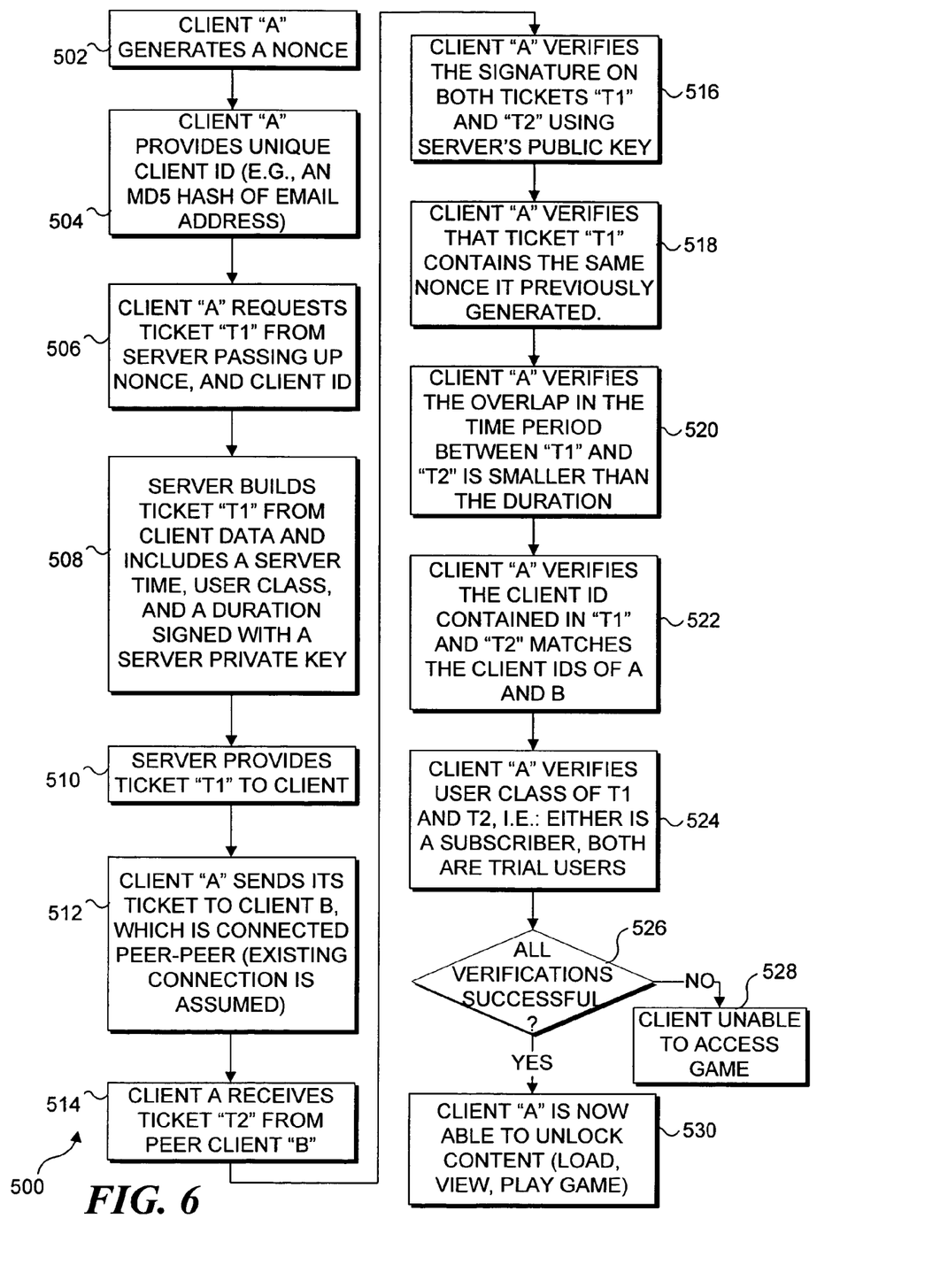
FIG. 6 is a flow chart showing the logical steps for implementing an embodiment of the present invention.

In FIG. 6, a flowchart 500 illustrates the logical steps that are implemented by the present invention in managing and controlling access and execution of a game program (or other software program), over a peer-peer network. The steps shown in FIG. 6 do not attempt to specify all of the details of each step, but instead attempt to more clearly explain the manner in which the invention operates. Accordingly, to simplify the following discussion, the term "client" is used is the following discussion instead of "client computing device," and the term "server" is used instead of "server computing device."

In a step 502, a client "A" requests access to a game program from a server. The server provides a control script to the client that causes the client to generate a nonce. Next, in a step 504, the client generates (or otherwise provides) a unique ID, such is an e-mail address of the user, Instead, this ID can be automatically determined by the server when the client connects with the server, e.g., by reference to a Passport of the user or the return URL of the client. Thus, the client may not affirmatively need to provide the unique ID in the request. As noted above, the client or server may optionally hash the ID, or simply use the ID in the clear, without hashing it.

A step 504 provides that client A requests a ticket T1 from the server, and in the request, passes the nonce and the ID to the server. In a step 508, the server builds ticket T1 from the client data that it received or determined. A portion of the ticket is signed with a server private key. This portion includes the nonce, the ID, a server timestamp, a user class (optionally), and optionally a trial token that indicates a duration for the trial use of the game software by the user (if not a subscriber). A step 510 indicates that the server provides the ticket to the client by transmitting it over the network.

In a step 512, client A sends its ticket to a client B (and to any other client who will be interactively using the software game on the peer-peer network). It is assumed that these clients are already connected over the peer-peer network, although they could potentially request the ticket before connecting to the peer-peer network. Similarly, in a step 514, client A receives a ticket T2 from client B (and a corresponding ticket from any other client who will be interactively using the game software on the peer-peer network). Client A uses the server public key to verify the digital signature included in the ticket received by client A from the server and in each ticket received from any other client, in a step 516. In a step 518, client A verifies that ticket T1 includes the same nonce that the client previously generated and sent with the request to the server. Thus, if the ticket received includes a different nonce, it must have been generated for the client during a different session or generated for a different client, or by a different source other than the server to which the request was sent by the client. Each other client performs the same step in regard to the tickets that they received from the server.

A step 520 provides that client A then verifies that an overlap exists between the time period indicated in tickets T1 and T2 (as well as in any other ticket(s) received from any other clients) and that the overlap is less than a predefined duration or time interval. This step confirms that a ticket issued a client in the past (i.e., one that is not for the current session) is not now being used by a client, since the time stamps on such a ticket will not be within a predefined duration or interval of the time stamp(s) on the other ticket(s) issued to clients that will interact during the current session. It should be noted that the server time stamp on the client's own ticket will be current because an old ticket would contain a different nonce and would prevent the client from continuing with the process for that reason. Tickets might expire, for example, after 10 minuets has elapsed since they were issued by the server.

A step 522 then requires that Client A verify that the IDs contained in tickets T1 and T2 match the respective actual IDs of users A and B. For example, this step can check to determine if the hash of the known email address for user A matches the hash of the email address ID in ticket T1, and that the hash of the known email address for user B matches the hash of the email address ID in ticket T2. As noted above, other types of IDs can instead be used, and it is not required that the ID actually be hashed. This step simply confirms that the tickets issued each client are for the actual users of those clients and were not issued to some other party.

If there is more than one user class, a step 524 can require that the client verify the user class indicated in ticket T1 and ticket T2 (as well as any others received by the client). For example, step 524 can verify that a user is in a group of subscribing users, or in a group of trial users. This step can also determine if one of the users is banned and take appropriate action, such as preventing any client connected in the peer-peer network from executing the game software, or alternatively, preventing only the client of the user who has been banned, from executing the game software. The user might have been banned for improper conduct during game play or for other behavior that violates rules with which the user agreed to abide. Trial users are users who are granted access to play the game software during a trial period, which might be one to two weeks, or some other period of time.

One or more of the users accessing game software may in the group of users who have subscribed to this software program, or in the alternative, users who have subscribed to the premium access service, giving the users to all of the premium software games. The subscription can thus be setup to grant subscribers access to and use of only a single software program, or alternatively, to grant access to and use of a suite of premium software programs. Also, as noted above, the invention can permit a user to play the game, even if a previous trial token granted the user has expired, if the user is invited to play by a subscriber to the game software or alternatively, can require that only users who have been issued a currently valid trial token or subscribing users can play the game software. Still other classes of users can be established and verified in step 524, to control how the software program is used.

A decision step 526 determines if all of the verifications/ confirmations made in steps 516-524 were successful. If not, in a step 528, the client advises the user that the game software cannot be run. Optionally, step 528 can apply to all clients coupled in the peer-peer network, if any verification fails for even one of the clients. If all verifications or confirmations were successful, in a step 530, the client is able to unlock the content of the game software. This step enables the client to download the game software from the server (if not already provided to the client) and decrypt or otherwise enable it, so that the game software can be loaded by the client, viewed, and executed (played) in connection with the other one or more clients.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. In a first client computing system that exists in a network that includes a plurality of other client systems that are network connectable to a server which stores a multiplayer game, a method for enabling the first client to initiate the multiplayer game with at least one other client other, the method comprising:

the first client initiating a peer request to at least one other client to participate in the multiplayer game and which causes the at least one other client to initiate requests to the server for access to the multiplayer game;

the first client initiating a first request to the sewer for access to the multiplayer game;

the first client receiving a control script from the server, wherein the control script is sent from the sewer to the first client in response to the first request to the server for access to the multiplayer game;

the first client executing the control script and generating a first nonce corresponding to the first request and the control script, the first nonce comprising a unique value;

the first client obtaining user information which can be used by the server to identify a user of the first client;

the first client providing the user information and the first nonce to the sewer in a second request, the second request comprising a request for a first ticket from the server and which can be used by the first client to access and participate in the multiplayer game, wherein the first ticket is built by the sewer from at least the first nonce and the user information, at least a portion of the first ticket being signed by a digital signature of the sewer with a server private key, the at least a portion including at least the first nonce, the user information, and a server timestamp;

the first client receiving the first ticket from the server;

the first client sending the first ticket to the at least one other client which received a corresponding second ticket from the server and which is invited to participate in the multiplayer game with the first client, wherein the second ticket is requested by the at least one other client from the server;

the first client receiving the corresponding second ticket from each of the at least one other client;

the first client using a server public key to verify the digital signature of the first ticket;

the first client using the server public key to verify a digital signature of the corresponding second ticket received from each of the at least one other client;

the first client verifying that the first ticket includes the first nonce and verifying that the timestamp associated with the first ticket overlaps with a timestamp of each corresponding second ticket and that the overlap is less than a predefined duration or interval, thereby confirming the first and each corresponding second ticket are valid for a current session of the multiplayer game;

the first client verifying the user information in the first ticket as well as other user information included in each corresponding second ticket; and the first client receiving access from the server to download the multiplayer game and to play the multiplayer game with the at least one other client after verifying at least the digital signature, the first nonce, the overlap of timestamps of the first and second tickets, and the user information, or being denied access from the server to download the multiplayer game and to play the multiplayer game with the at least one other client upon failing to verify at least the digital signature, the first nonce, the overlap of timestamps of the first and second tickets, and the user information.

2. A computer readable storage media having stored thereon computer readable machine instructions, which when executed by a processor, carry out the method of claim 1.

3. The method of claim 1, further comprising, while receiving the first ticket from the server, the first client also receiving computer executable instructions from the server which must be executed by the first client to proceed to access the multiplayer game and which forces the first client to load a gateway page in the browser control.

4. The method of claim 3, further comprising the first client executing the computer executable instructions.

5. The method of claim 1, wherein the first client verifying the user information in the first ticket comprises obtaining a hash of an indicia of the user of the first client in the least a portion of the first ticket that is signed by the server, the first client determining that the indicia matches that of the user of the first client to confirm that the user information included in the at least a portion of the first ticket is actually associated with the user of the first client.

6. The method of claim 1, wherein the at least a portion of the first ticket further includes a user class and a trial token that indicates a duration for the trial use of the multiplayer game by the user of the first client.

7. The method of claim 6, further comprising the first client verifying the user class in the first ticket as well as another user class included in each corresponding second ticket, the first client receiving access from the server to download the multiplayer game and to play the multiplayer game with the at least one other client after further verifying the user class, or being denied access from the server to download the multiplayer game and to play the multiplayer game with the at least one other client upon failing to further verify the user class.

8. The method of claim 7, wherein the user class comprises a banned user, and wherein the first client is denied access from the server to download the multiplayer game and to play the multiplayer game with the at least one other client if at least the user of the first client has been banned from accessing the multiplayer game.

9. The method of claim 7, wherein the user class comprises a banned user, and wherein the first client is denied access from the server to download the multiplayer game and to play the multiplayer game with the at least one other client if at least one user of the at least one other clients has been banned from accessing the multiplayer game.

10. The method of claim 7, further comprising the first client receiving a trial token during a trial period, to enable the user of the first client to access the multiplayer game during the trial period.

11. The method of claim 7, wherein the user class includes at least one of:
    a subscriber group that includes subscribers to the multiplayer game; and
    a trial group that includes users who have been issued the trial token to execute the multiplayer game for a trial period.

12. The method of claim 11, further comprising:
    the first client receiving a trial token from the server for the user of the first client when first client first makes the first request to access the multiplayer game; and
    the first client receiving access from the server to download the multiplayer game and to play the multiplayer game with the at least one other client if the trial token is still valid, or if the user of the first client has become a subscriber to the multiplayer game.

13. The method of claim 12, further comprising the first client receiving access from the sewer to download the multiplayer game and to play the multiplayer game with the at least one other client if it is first confirmed that the user of the first client is not a subscriber to the multiplayer game and that the user of the first client has a trial token that has not expired and if it has also been confirmed that at least one user of at least one other clients is a subscriber to the multiplayer game.

14. The method of claim 12, further comprising the first client receiving access from the sewer to download the multiplayer game and to play the multiplayer game with the at least one other client if it is first confirmed that the user of the first client is not a subscriber to the multiplayer game and that the user of the first client does not have a valid trial token and if it has also been confirmed that at least one user of at least one other clients is a subscriber to the multiplayer game.

15. The method of claim 11, further comprising enabling the user of the first client to become a subscriber to the multiplayer game.

16. In a first client computing system that exists in a network that includes a plurality of other client systems that are network connectable to a server which stores a multiplayer game, a method for enabling the first client to initiate the multiplayer game with at least one of the plurality of other clients, the method comprising:
    the first client initiating a first request to the server for access to the multiplayer game;
    the first client receiving a control script from the server, wherein the control script is sent from the server to the first client in response to the first request to the server for access to the multiplayer game;
    the first client executing the control script and generating a first nonce corresponding to the first request and the control script, the first nonce comprising a unique value;
    the first client obtaining user information which can be used by the server to identify a user of the first client;
    the first client providing the user information and the first nonce to the server in a second request, the second request comprising a request for a first ticket from the server and which can be used by the first client to access and participate in the multiplayer game, wherein the first ticket is built by the server from at least the first nonce and the user information, at least a portion of the first ticket being signed by a digital signature of the server with a server private key, the at least a portion including at least the first nonce, the user information, and a server timestamp, wherein the at least a portion of the first ticket further includes a user class and a trial token that indicates a duration for the trial use of the multiplayer game by the user of the first client;
    the first client receiving the first ticket from the server;
    the first client sending the first ticket to the at least one other client which received a corresponding second ticket from the server, the second ticket being sent to the at least one other client in response to a request sent to the server from the at least one other client for access to the multiplayer game, and which is invited to participate in the multiplayer game with the first client;
    the first client receiving the corresponding second ticket from each of the at least one other client;
    the first client using a sewer public key to verify the digital signature of the first ticket;
    the first client using the server public key to verify a digital signature of the corresponding second ticket received from each of the at least one other client;
    the first client verifying that the first ticket includes the first nonce and verifying that the timestamp associated with the first ticket overlaps with a timestamp of each corresponding second ticket and that the overlap is less than a predefined duration or interval, thereby confirming the first and each corresponding second ticket are valid for a current session of the multiplayer game;
    the first client verifying the user information in the first ticket as well as other user information included in each corresponding second ticket;

the first client receiving access from the server to download the multiplayer game and to play the multiplayer game with the at least one other client after verifying at least the digital signature, the first nonce, the overlap of timestamps of the first and second tickets, and the user information, or being denied access from the server to download the multiplayer game and to play the multiplayer game with the at least one other client upon failing to verify at least the digital signature, the first nonce, the overlap of timestamps of the first and second tickets, and the user information; and the first client verifying a user class in the first ticket as well as another user class included in each corresponding second ticket, the first client receiving access from the server to download the multiplayer game and to play the multiplayer game with the at least one other client after further verifying the user class, or being denied access from the server to download the multiplayer game and to play the multiplayer game with the at least one other client upon failing to further verify the user class.

17. A computing system comprising a processor and memory storing computer executable instructions, which when executed by the computing system implement the method recited in claim 1.

* * * * *